United States Patent Office 3,365,364
Patented Jan. 23, 1968

3,365,364
NOVEL PYRAZOLO STEROIDS
Daniel Bertin, Montrouge, and Lucien Nedelec, Clichy-sous-Bois, France, assignors to Roussel-Uclaf, Paris, France, a corporation of France
No Drawing. Continuation-in-part of application Ser. No. 472,688, July 16, 1965. This application Sept. 14, 1965, Ser. No. 487,324
Claims priority, application France, July 22, 1964, 982,628; Oct. 21, 1964, 992,157
18 Claims. (Cl. 167—65)

ABSTRACT OF THE DISCLOSURE

Novel 17-hydroxy-$\Delta^{1,3,5}$.

---

The invention relates to novel 17-hydroxy-$\Delta^{1,3,5(10)}$-estratrieno [16c-17]-dihydropyrazoles of the formula

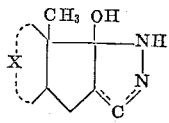

I wherein X represents A, B and C rings of a $\Delta^{1,3,5(10)}$-estratriene compound which may be substituted and which may contain a 9(11) double bond and the dotted lines represent the two possible positions of the double bond in the dihydropyrazole radical and to a novel process for the preparation of the said products.

Prior application

The present application is a continuation-in-part application of our copending, commonly assigned U.S. application Ser. No. 472,688, filed July 16, 1965, and now abandoned, which is entitled to the benefit of French applications Ser. No. 982,628, filed July 22, 1964, and No. 992,157, filed Oct. 21, 1964.

Prior art

Various pyrazolo steroids in which the heterocyclic radical is attached to the 16,17-positions of the D ring are known but since the said steroids are usually made by reaction with hydrazine hydrochloride, the products lack a hydroxyl radical on the pyrazolo radical. M. J. Michelson in his thesis entitled "Synthesis and Stereochemistry of 2-Pyrazolines," 1962 Univ. Mich., 63, p. 2003 (1963), and P. Ruggieri et al., Gazz. Chim. Ital., vol. 93 (1963), p. 269, describe the use of hydrazine hydrate or hyrazine to form pyrazolo steroids but since the said reactions were effected by heating at the reflux point of the solvents, hydroxy pyrazolo steroids which are formed as intermediates when hydrazine is reacted with a dicarbonyl steroid could not be isolated.

Objects of the invention

It is an object of the invention to provide a novel process for the preparation of 17-hydroxy-$\Delta^{1,3,5(10)}$-estratrieno [16c-17]-dihydropyrazoles of Formula I.

It is another object of the invention to provide novel 17-hydroxy-$\Delta^{1,3,5(10)}$-estratrieno [16c-17] - dihydropyrazoles of Formula I.

It is an additional object of the invention to provide novel intermediates for 17-hydroxy-$\Delta^{1,3,5(10)}$-estratriene [16c-17]-dihydropyrazoles of Formula I.

It is a further object of the invention to provide anticholesterolemic compositions.

It is another object of the invention to provide a novel method of treating hypercholesterolemia.

These and other objects and advantages of the invention will become obvious from the following detailed description.

The invention

The novel 17-hydroxy-$\Delta^{1,3,5(10)}$-estratrieno [16c-17] dihydropyrazoles of the invention have the formula

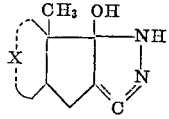

I wherein X represents the A, B and C rings of a $\Delta^{1,3,5(10)}$-estratriene compound which may contain substituents selected from the group consisting of halogen, hydroxy, lower alkyl, lower alkoxy, lower alkanoyloxy, dilower alkyl ketal, dilower alkyl thio ketal, lower alkyl enolic ether, lower alkyl enolic thio ether and lower alkanoyloxy enol and may have a double bond in the 9(11)-position and the dotted lines represent the two possible positions of the double bond in the dihydropyrazole radical.

The compounds of Formula I possess interesting pharmacological properties, namely anticholesterolemic activity with little or no estrogenic activity. The said products are useful for the treatment of hypercholesterolemia.

Examples of products within the scope of the invention are 3-methoxy-17-hydroxy-$\Delta^{1,3,5(10)}$-estratrieno [16c-17]-dihydropyrazole, 3-chloro-17-hydroxy-$\Delta^{1,3,5(10)}$-estratrieno [16c-17]-dihydropyrazole, 2-methyl-3-methoxy - 17 - hydroxy-$\Delta^{1,3,5(10)}$-estratrieno [16c-17]-dihydropyrazole, 3-methoxy-17-hydroxy-$\Delta^{1,3,5(10),9(11)}$-estratetraeno [16c-17]-dihydropyrazole, 2-fluoro-3,17-dihydroxy-$\Delta^{1,3,5(10)}$-estratrieno [16c-17]-dihydropyrazole, 3-methoxy-11$\beta$,17-dihydroxy-$\Delta^{1,3,5(10)}$-estratrieno [16c-17]-dihydropyrazole.

The novel process of the invention for the preparation of the 17-hydroxy-$\Delta^{1,3,5(10)}$-estratriene [16c-17]-dihydropyrazoles of Formula I comprises condensing a 16-hydroxymethylene-17-oxo-$\Delta^{1,3,5(10)}$-estratriene of the formula

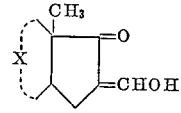

wherein X has the above definition with a compound selected from the group consisting of hydrazine and hydrazine hydrate in an organic solvent at temperatures from 0 to 30° C. to form the corresponding 17-hydroxy-$\Delta^{1,3,5(10)}$-estratrieno [16c-17]-dihydropyrazole.

Examples of suitable solvents are lower alkanols such as methanol, ethanol, etc., lower alkyl ethers such as ethyl ether and aromatic hydrocarbons such as benzene, etc. The reaction is preferably effected in ethanol at about room temperature. Depending upon the particular starting material and the reaction temperature, the speed of reacting will vary but is usually effected within a short period of time up to a half hour.

Examples of suitable starting materials for the process of the invention are 3-methoxy-16-hydroxymethylene-17-oxo-$\Delta^{1,3,5(10)}$-estratriene, 2-methyl-3-methoxy-16-hydroxymethylene-17-oxo-$\Delta^{1,3,5(10)}$-estratriene, 3-chloro - 16-hydroxymethylene-17-oxo-$\Delta^{1,3,5(10)}$-estratriene, 3 - methoxy-16-hydroxymethylene-17-oxo-$\Delta^{1,3,5(10),9(11)}$ - estratetraene, 3-methoxy-11$\beta$-hydroxy-17-oxo - 16 - hydroxymethylene-$\Delta^{1,3,5(10)}$-estratriene, 2-fluoro-3-methoxy-16-hydroxymethylene-17-oxo-$\Delta^{1,3,5(10)}$-estratriene. Reactive groups such as ketones in positions other than the 17-position of the starting steroids may be protected before the reaction by customary methods to prevent secondary condensations.

The novel anti-cholesterolemic compositions of the invention are comprised of at least one 17-hydroxy- $\Delta^{1,3,5(10)}$-estratriene [16c-17]-dihydropyrazoles having the formula

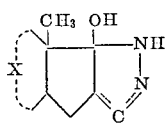

wherein X represents the A, B and C rings of a $\Delta^{1,3,5(10)}$-estratriene compound which may contain substituents selected from the group consisting of halogen, hydroxy, lower alkyl, lower alkoxy, lower alkanoyloxy, dilower alkyl ketal, dilower alkyl thio ketal, lower alkyl enolic ether, lower alkyl enolic thio ether and lower alkanoyloxy enol and may have a double bond in the 9(11)-position and the dotted lines represent the two possible positions of the double bond in the dihydropyrazole radical and a major amount of a pharmaceutical carrier. The compositions can be prepared in the form of injectable solutions or suspensions, in the form of ampoules or multiple dose flacons, in the form of tablets, coated tablets, capsules and suppositories prepared in the usual manner.

The method of the invention of treating hypercholesterolemia in warm-blooded animals comprises administering to the animals an effective amount of at least one 17 - hydroxy-$\Delta^{1,3,5(10)}$-estratriene [16c-17]-dihydropyrazoles having the formula

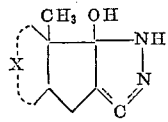

wherein X represents the A, B and C rings of a $\Delta^{1,3,5(10)}$-estratriene compound which may contain substituents selected from the group consisting of halogen, hydroxy, lower alkyl, lower alkoxy, lower alkanoyloxy, dilower alkyl ketal, dilower alkyl thio ketal, lower alkyl enolic ether, lower alkyl enolic thio ether and lower alkanoyloxy enol and may have a double bond in the 9(11)-position and the dotted lines represent the two possible positions of the double bond in the dihydropyrazole radical. The products may be administered orally, perlingually, subcutaneously or rectally. The usual daily dosage for adults is between 1 and 50 mg. depending upon the method of administration.

In the following examples there are described several preferred embodiments to illustrate the invention. However, it should be understood that the invention is not intended to be limited to the specific embodiments.

EXAMPLE I

*Preparation of 3-methoxy-17-hydroxy-$\Delta^{1,3,5(10)}$-estratrieno [16c-17]-dihydropyrazole*

Under an atmosphere of nitrogen, 2 gm. of 3-methoxy-16 - hydroxymethylene - 17 - oxo-$\Delta^{1,3,5(10)}$-estratriene, prepared according to Bardhan, Journal of the Chemical Society, p. 1848 (1936), were added to 20 cc. of ethanol and then 2.44 cc. of hydrazine hydrate were added thereto, and the reaction mixture was agitated for 10 minutes at a temperature of 30° C. Next, the reaction mixture was iced, vacuum filtered, and the precipitate was washed with iced ethanol, dried and recrystallized from acetone under reflux to obtain 1.17 gm. of 3-methoxy-17-hydroxy-$\Delta^{1,3,5(10)}$-estratrieno [16c-17)-dihydropyrazole having a melting point of 174–176° C. and a specific rotation $[\alpha]_D^{20}=+163.5°$ (c.=1% in chloroform).

This compound occurred in the form of colorless crystals and was insoluble in water, propylene glycol and acetylamine, slightly soluble in alcohol, ether and benzene and soluble in acetone and chloroform.

The product is not described in the literature.

EXAMPLE II

*Preparation of 3-chloro-17-hydroxy-$\Delta^{1,3,5(10)}$-estratrieno [16c-17]-dihydropyrazole*

Step A: *Preparation of 3-chloro-17-oxo-$\Delta^{1,3,5(10)}$-estratriene.*—5 gm. of 3-chloro-17β-hydroxy-$\Delta^{1,3,5(10)}$-estratriene (described in United States Patent No. 3,117,140) were dissolved in 100 cc. of acetone and 8 cc. of a 8 N sulfochromic solution were added thereto. The mixture was agitated for a few minutes at room temperature and then 5 cc. of methanol were added thereto. After a short rest period, the reaction mixture was diluted with 100 cc. of water and the precipitate which formed was vacuum filtered, washed with water until the wash waters were neutral to obtain 4.970 gm. of raw product. The said product was dissolved in chloroform and the resulting solution was treated with animal charcoal and filtered. The filtrate was concentrated and methanol was added at distillation and the crystallized product was vacuum filtered and dried to obtain 4.360 gm. of 3-chloro-17-oxo-$\Delta^{1,3,5(10)}$-estratriene which was purified by successive trituration in ethanol and ethyl acetate to obtain 4.1 gm. of pure product having a melting point of 252° C. and a specific rotation $[\alpha]_D^{20}=+150°\pm1.5$ (c.=0.75% in chloroform).

The product was soluble in chloroform, slightly soluble in ethyl acetate, very slightly soluble in alcohol and insoluble in water.

*Analysis.*—$C_{18}H_{21}OCl$; molecular weight=288.805. Calculated: C, 74.85%; H, 7.33%; Cl, 12.28%. Found: C, 74.8; H, 7.5; Cl, 12.1.

This compound is not described in the literature.

Step B: *Preparation of 3-chloro-16-hydroxymethylene-17-oxo-$\Delta^{1,3,5(10)}$estratriene.*—3 gm. of 3-chloro-17-oxo-$\Delta^{1,3,5(10)}$-estratriene were added to 300 cc. of anhydrous benzene and then 30 cc. of anhydrous ethyl formate, 3 gm. of 50% sodium hydride and 1.8 cc. of methanol were added thereto, and the reaction mixture was heated at reflux for 2 hours while being agitated under an atmosphere of nitrogen. Then the mixture was cooled and poured into water and the aqueous phase was washed with ether. The organic solvent was expelled with a current of nitrogen and the solution was filtered and acidified to a pH value of 1 by the addition of hydrochloric acid. The mixture was vacuum filtered and the precipitate was washed with water until the wash waters were neutral and dried to obtain 2.4 gm. of 3-chloro-16-hydroxymethylene-17-oxo-$\Delta^{1,3,5(10)}$-estratrien having a melting point of 193° C. and a specific rotation $[\alpha]_D^{20}=+108°\pm1$ (c.=1% in dimethylformamide).

The product was colorless and slightly soluble in alcohol and chloroform.

*Analysis.*—$C_{19}H_{21}O_2Cl$; molecular weight=316.815. Calculated: C, 72.02%; H, 6.68%; Cl, 11.2%. Found: C, 71.5; H, 6.6; Cl, 11.1.

This compound is not described in the literature.

Step C: *Preparation of 3-chloro-17-hydroxy-$\Delta^{1,3,5(10)}$-estratrieno [16c-17]-dihydropyrazole.*—A mixture of 1.56 gm. of 3-chloro-16-hydroxymethylene-17-oxo-$\Delta^{1,3,5(10)}$-estratriene, 15 cc. of ethanol and 1 cc. of hydrazine hydrate was agitated at room temperature under a nitrogen atmosphere. After 10 minutes of agitation, the dissolution was complete and was followed by reprecipitation. Then, the precipitate was agitated for an additional 10 minutes after which 15 cc. of ice water were added and the mixture was vacuum filtered, washed with iced ethanol and dried to obtain 3-chloro-17-hydroxy-$\Delta^{1,3,5(10)}$-estratrieno [16c-17]-dihydropyrazole in the form of colorless crystals with a melting point at about 120° C. I.R. bands at 3,600 cm.⁻¹, 3,380 cm.⁻¹, 1,590 cm.⁻¹ and 1,485 cm.⁻¹.

This compound is not described in the literature.

EXAMPLE III

*Preparation of 2-methyl-3-methoxy-17-hydroxy-$\Delta^{1,3,5(10)}$-estratrieno [16c-17]-dihydropyrazole*

Step A: *Preparation of 2-methyl-3-methoxy-17β-hydroxy-$\Delta^{1,3,5(10)}$-estratriene.*—15.9 gm. of 2-methyl-estradiol were added to 80 cc. of acetone and after 43 cc. of a normal sodium hydroxide solution and 16 cc. of water were added to the mixture, it was brought to reflux. Then 8.8 cc. of methyl sulfate were added and the mixture was maintained at reflux for about 30 minutes and then cooled to room temperature. The reaction mixture was poured into water and the precipitate formed was vacuum filtered, washed with water and dried under vacuum and recrystallized from isopropyl ether to obtain 14.65 gm. of 2-methyl-3-methoxy-17-hydroxy-$\Delta^{1,3,5(10)}$-estratriene having a melting point of 142° C.

The product was insoluble in water, acids and in dilute alkalis.

*Analysis.*—$C_{20}H_{28}O_2$; molecular weight=300.42. Calculated: C, 79.97%; H, 9.39%; O, 10.64%. Found: C, 79.85; H, 9.45; O, 10.7.

The starting product is described in Patent No. 3,166,577.

Step B: *Preparation of 2-methyl-3-methoxy-17-oxo-$\Delta^{1,3,5(10)}$-estratriene.*—Under an atmosphere of nitrogen and cooling, 5 gm. of chromic anhydride were added to 50 cc. of pyridine and then 5 gm. of 2-methyl-3-methoxy-17β-hydroxy-$\Delta^{1,3,5(10)}$-estratriene dissolved in 25 cc. of pyridine were added thereto. The mixture was subjected to agitation at room temperature for about 25 hours after which the reaction mixture was poured into water and the organic phase was separated and extracted several times with methylene chloride. The methylene chloride solution was washed successively with normal hydrochloric acid, with a saturated sodium bicarbonate solution and finally with water until the wash waters were neutral. Then the solution was dried over sodium sulfate, treated with animal charcoal, vacuum filtered and concentrated to dryness. By recrystallization of the residue from ethanol, 4 gm. of 2-methyl-3-methoxy-17-oxo-$\Delta^{1,3,5(10)}$-estratriene having a melting point of 153° C. and a specific rotation $[\alpha]_D^{20}=+161.4°$ (c.=0.5% in methanol) were obtained.

The product was soluble in refluxing methanol, slightly soluble in isopropyl ether and insoluble in water, acids and dilute alkalis.

*Analysis.*—$C_{20}H_{26}O_2$; molecular weight=298.41. Calculated: C, 80.49%; H, 8.78%. Found: C, 80.5; H, 8.7.

This compound is not described in the literature.

Step C: *Preparation of 2-methyl-3-methoxy-16-hydroxymethylene-17-oxo-$\Delta^{1,3,5(10)}$-estratriene.*—3 gm. of 2-methyl-3-methoxy-17-oxo-$\Delta^{1,3,5(10)}$-estratriene were added to 300 cc. of anhydrous benzene and 30 cc. of anhydrous ethyl formate, 3 gm. of 50% sodium hydride and 1.8 cc. of methanol were added thereto. The reaction mixture was heated at reflux for about 2 hours while being agitated and under an atmosphere of nitrogen and then the reaction mixture was cooled and poured into water. The aqueous phase was washed with ether and after the organic solvent was expelled by allowing nitrogen to bubble therethrough, the solution was filtered and acidified to a pH value of 1 by the addition of hydrochloric acid. The precipitate formed was vacuum filtered, washed with water until the wash waters were neutral and dried to obtain 2.5 gm. of raw 2-methyl-3-methoxy-16-hydroxymethylene-17-oxo-$\Delta^{1,3,5(10)}$-estratriene which was directly utilized for the preparation of 2-methyl-3-methoxy-17-hydroxy-$\Delta^{1,3,5(10)}$-estratrieno [16c-17]-dihydropyrazole.

This compound is not described in the literature.

Step D: *Preparation of 2-methyl-3-methoxy-17-hydroxy-$\Delta^{1,3,5(10)}$-estratrieno [16c-17]-dihydropyrazole.*—A mixture of 1.1 gm. of 2-methyl-3-methoxy-16-hydroxymethoxy-17-hydroxy-$\Delta^{1,3,5(10)}$-estratrieno [16c-17]-dihydro and 1.2 cc. of hydrazinehydrate was agitated at room temperature under a nitrogen atmosphere. After 15 minutes of agitation, a nearly complete dissolution was attained, followed by reprecipitation. The precipitate was cooled to 0° C., vacuum filtered, washed with iced ethanol and dried to obtain 2-methyl-3-methoxy-17-hydroxy-$\Delta^{1,3,5(10)}$-estratrieno [16c-17]-dihydropyrazole. I.R. bands at 3,600 cm.$^{-1}$ and 3,400 cm.$^{-1}$ and in the range of 1,600 cm.$^{-1}$ and 1,500 cm.$^{-1}$ due to the substituted aromatic nucleus.

The product was insoluble in water, fairly soluble in alcohol and soluble in chloroform.

This compound is not described in the literature.

EXAMPLE IV

*Preparation of 3-methoxy-17-hydroxy-$\Delta^{1,3,5(10),9(11)}$-estratetraeno [16c-17]-dihydropyrazole*

Step A: *Preparation of 3-methoxy-16-hydroxymethylene-17-oxo-$\Delta^{1,3,5(10),9(11)}$-estratetraene.*—Under an atmosphere of nitrogen, a solution of 7.7 gm. of 3-methoxy-17-oxo-$\Delta^{1,3,5(10),9(11)}$-estratetraene was agitated in 300 cc. of benzene and 23 cc. of ethyl formate and then 10 gm. of 50% sodium hydride were added. The reaction mixture was kept under agitation at room temperature for about 5 hours after which the mixture was heated to reflux under agitation for 45 minutes, then cooled, and 300 cc. of water were added thereto. Next, the aqueous phase was separated, the aromatic phase was extracted with water and the various aqueous phases were combined, washed with ether and acidified with hydrochloric acid. The precipitate formed was vacuum filtered, washed with water, dried and recrystallized from the methyl ethyl ketone to obtain 7.2 gm. of 3-methoxy-16-hydroxymethylene-17-oxo-$\Delta^{1,3,5(10),9(11)}$-estratetraene having a melting point of 162° C. and a specific rotation $[\alpha]_D^{20}=+215°\pm1$ (c.=1% in dimethylformamide).

The product was soluble in chloroform and in dilute aqueous alkalis, slightly soluble in alcohols and acetone.

*Analysis.*—$C_{20}H_{22}O_3$; molecular weight=310.38. Calculated: C, 77.39%; H, 7.14%. Found: C, 77.4; H, 7.1.

This compound is not described in the literature.

The starting product was prepared according to the method in J. Chem. Soc. (1963) page 5086.

Step B: *Preparation of 3-methoxy-17-hydroxy-$\Delta^{1,3,5(10),9(11)}$-estratetraeno [16c-17]-dihydropyrazole.*—Using the procedure of Step D of Example III, hydrazine hydrate and 3-methoxy-16-hydroxymethylene-17-oxo-$\Delta^{1,3,5(10),9(11)}$-estratetraene were reacted to obtain 3-methoxy-17-hydroxy-$\Delta^{1,3,5(10),9(11)}$-estratetraeno [16c-17]-dihydropyrazole in the form of colorless crystals. I.R. bands at 3,600 and 3,400 cm.$^{-1}$.

This compound is not described in the literature.

EXAMPLE V

*Preparation of the 2-fluoro-3,17-dihydroxy-$\Delta^{1,3,5(10)}$-estratrieno [16c-17]-dihydropyrazole*

Step A: *Preparation of 2-fluoro-3-hydroxy-16-hydroxymethylene-17-oxo-$\Delta^{1,3,5(10)}$-estratriene.*—1.6 gm. of 2-fluoro-estrone were placed in suspension in 140 cc. of benzene and 18 cc. of ethyl formate and 0.8 gm. of sodium hydride were added thereto. Then, slowly, 0.8 cm. of methanol were added to the mixture and it was held at reflux for 1½ hours, cooled, and diluted with water. The alkaline phase was decanted, washed with a benzene-ether mixture, filtered, degasified under atmosphere of nitrogen and slowly acidified with hydrochloric acid. The precipitate was vacuum filtered and then dried to obtain 1.57 gm. of 2-fluoro-3-hydroxy-16-hydroxymethylene-17-oxo-$\Delta^{1,3,5(10)}$-estratriene having a melting point of 250° C.

The product occurred in the form of a colorless solid, soluble in dilute aqueous alkalis, alcohol, benzene and chloroform and insoluble in water and in dilute aqueous acids.

This compound is not described in the literature.

The starting product was prepared according to the method described in Biochem. Z., 1963, page 628, 338.

*Step B: Preparation of 2-fluoro-3,17-dihydroxy-$\Delta^{1,3,5(10)}$ - estratrieno [16c-17] - dihydropyrazole.*—Using the procedure of Step D of Example III, hydrazine hydrate and 2 - fluoro - 3-hydroxy-16-hydroxymethylene-17-oxo-$\Delta^{1,3,5(10)}$-estratriene were reacted to form 2-fluoro-3,17-dihydroxy-$\Delta^{1,3,5(10)}$-estratrieno [16c-17]-dihydropyrazole.

This compound is not described in the literature.

EXAMPLE VI

*Preparation of 3-methoxy-11β,17-dihydroxy-$\Delta^{1,3,5(10)}$-estratrieno [16c-17]-dihydropyrazole*

Using the procedure of Step D of Example III, hydrazine hydrate and 3 - methoxy - 11β - hydroxy - 16 - hydroxy - methylene - 17 - oxo - $\Delta^{1,3,5(10)}$ - estratriene prepared starting from 3 - methoxy - 11β - hydroxy - 17-oxo - $\Delta^{1,3,5(10)}$ - estratriene obtained according to Patent No. 2,874,173 were reacted to obtain 3 - methoxy - 11β, 17 - dihydroxy - $\Delta^{1,3,5(10)}$ - estratrieno [16c-17] - dihydropyrazole.

*Pharmacological study of 3-methoxy-17-hydroxy-$\Delta^{1,3,5(10)}$-estratrieno [16c-17]-dihydropyrazole*

(1) *Hypocholesterolemic action in the female rat.*—The test was conducted on groups of female rats having an average weight of 200 gm. The said product was utilized in aqueous suspensions and was administered orally to said female rats at daily doses of 50, 100, 200 and 500 γ/kg. for a period of 10 days. One group of female rats of the same age and weight served as the control. Samples of blood were taken on the 11th day in order to determine the amount of seric sterols and the animals were sacrificed the same day. The uterus, liver, kidneys and suprarenals of the animals were separated and weighed. The following table presents the results obtained.

TABLE

| Groups | Doses, γ/kg. | Seric sterols, gm. ⁰/₀₀ | Uterus, mg. | Suprarenals, mg. | Liver, g. percent g. | Kidneys, mg. percent g. | Amount of body weight, percent |
|---|---|---|---|---|---|---|---|
| Controls | 0 | 0.64 | 377 | 55.2 | 4.03 | 694 | +4 |
| Treated | 50 | 0.51 (−19%) | 385 | 54.4 | 4.14 | 654 | +4 |
| Controls | 0 | 0.61 | 385 | 61.8 | 3.95 | 707 | +12 |
| Treated | 50 | 0.39 (−36%) | 382 | 58.7 | 3.84 | 726 | +10 |
|  | 100 | 0.31 (−49%) | 358 | 68.9 | 4.28 | 719 | +5 |
| Controls | 0 | 0.77 | 427 | 57.9 | 4.14 | 717 | +8 |
| Treated | 200 | 0.30 (−61%) | 369 | 63.7 | 4.53 | 727 | +6 |
|  | 500 | 0.22 (−72%) | 518 | 71.5 | 4.84 | 745 | +5 |

At the dose of 50γ/kg., the results were not constant. The dose of 100γ/kg. was the minimum active dose. The weight of the different organs weighed, namely the suprarenals, the liver, the kidneys, and the uterus, was slightly affected by the treatment with hypertrophy of the suprarenals significant only at the largest dose of 500 γ/kg. Administered under the experimental conditions, 3-methoxy - 17 - hydroxy - $\Delta^{1,3,5(10)}$ - estratrieno [16c-17]-dihydropyrazole did not appear in the serum of the animals treated as would be evidenced by the presence of sterols other than cholesterol such as desmosterol or 7-dihydrocholesterol.

(2) *Investigation of the estrogenic activity—Allen and Doisy test.*—3 - methoxy - 17 - hydroxy - $\Delta^{1,3,5(10)}$ - estratrieno [16c - 17] - dihydropyrazole was utilized in suspension in an aqueous dispersant and was administered orally to groups of castrated female rats. Single administrations at doses of 200γ, 1 mg. 1.5 mg. 2 mg. and 5 mg. per animal were used. Vaginal smears were taken each day starting from the second day of treatment and for a period of 7 consecutive days. Only those smears formed exclusively of keratinized cells were retained as positive. The test results showed that the rat unit was about 1.5 mg. per female rat, whereas it was 30γ for estradiol which demonstrates the low estrogenic activity of the said compound.

Various modifications of the compositions and process of the invention may be made without departing from the spirit or scope thereof and it is to be understood that the invention is to be limited only as defined in the appended claims.

We claim:

1. 3 - methoxy - 17 - hydroxy - $\Delta^{1,3,5(10)}$ - estratrieno [16c–17] - dihydropyrazole.

2. 3 - chloro - 17 - hydroxy - $\Delta^{1,3,5(10)}$ - estratrieno [16c–17] - dihydropyrazole.

3. 2 - methyl - 3 - methoxy - 17 - hydroxy - $\Delta^{1,3,5(10)}$-estratrieno [16c–17] - dihydropyrazole.

4. 3 - methoxy - 17 - hydroxy - $\Delta^{1,3,5(10),9(11)}$ - estratetraeno [16c–17] - dihydropyrazole.

5. 2 - fluoro - 3,17 - dihydroxy - $^{1,3,5(10)}$ - estratrieno [16c–17] - dihydropyrazole.

6. 3 - methoxy - 11β,17 - dihydroxy - $\Delta^{1,3,5(10)}$ - estratrieno [16c–17] - dihydropyrazole.

7. 3 - chloro - 17 - oxo - $\Delta^{1,3,5(10)}$ - estratriene.

8. 3 - chloro - 16 - hydroxymethylene - 17 - oxo-$\Delta^{1,3,5(10)}$ - estratriene.

9. 3 - methoxy - 16 - hydroxymethylene - 17 - oxo-$\Delta^{1,3,5(10),9(11)}$-estratetraene.

10. 2 - fluoro - 3 - hydroxy - 16 - hydroxymethylene-17 - oxo - $\Delta^{1,3,5(10)}$ - estratriene.

11. 3 - methoxy - 11β - hydroxy - 16 - hydroxymethylene - 17 - oxo - $\Delta^{1,3,5(10)}$ - estratriene.

12. A novel antichloesterolemic composition comprised of 1 to 50 mg. of 3-methoxy-17-hydroxy-$\Delta^{1,3,5(10)}$-estratrieno [16c–17]-dihydropyrazole and a pharmaceutical carrier.

13. A method of treating hydercholesterolemia in warm-blooded animals which comprises administering to the animals an effective amount of 3-methoxy-17-hydroxy-$\Delta^{1,3,5(10)}$-estratrieno [16c–17]-dihydropyrazole.

14. A compound having a formula selected from the group consisting of

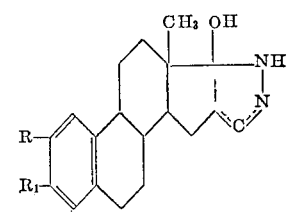

and

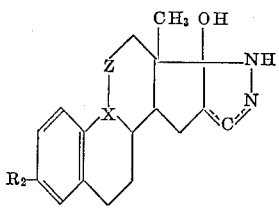

wherein R is selected from the group consisting of hydrogen, lower alkyl and fluorine, $R_1$ is selected from the group consisting of hydroxy, lower alkoxy and chlorine and $R_2$ is lower alkoxy and $>X-Z$ is selected from the group consisting of

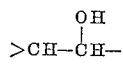

and $>C=CH-$ and the dotted lines represent the two possible positions of the double bond in the dihydropyrazole ring.

15. An antichloesterolemic composition comprising at least one compound of claim 14 and a major amount of a pharmaceutical carrier.

16. A method of treating hypercholesterolemia in warm-blooded animals which comprises administering to warm-blooded animals an effective amount of a compound of claim 14.

17. A process for the preparation of a dihydropyrazole of claim 14 which comprises condensing a compound having a formula selected from the group consisting of

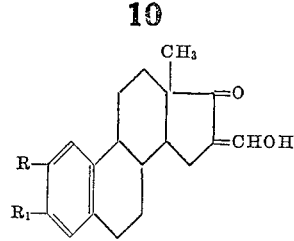

and

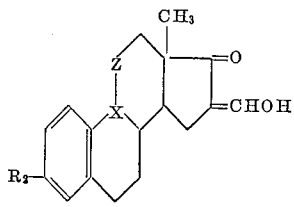

wherein R, $R_1$, $R_2$ and $>X-Z-$ have the definitions of claim 14 with a compound selected from the group consisting of hydrazine and hydrazine hydrate in an organic solvent at temperatures from 0 to 30° C. to form the corresponding compound of claim 14.

18. The process of claim 17 wherein the reaction is effected in ethanol at about room temperature.

References Cited

UNITED STATES PATENTS 3,047,568   7/1962   Kissman et al. ____ 260—239.55
3,213,084  10/1965   Schaub et al. _____ 260—239.5

ELBERT L. ROBERTS, *Primary Examiner.*